US009020503B2

(12) United States Patent
Ahluwalia et al.

(10) Patent No.: US 9,020,503 B2
(45) Date of Patent: Apr. 28, 2015

(54) CONNECTION ESTABLISHMENT SYSTEM AND METHOD

(75) Inventors: Jagdeep Singh Ahluwalia, Tokyo (JP); Neeraj Gupta, Tokyo (JP); Francesca Serravalle, Tokyo (JP)

(73) Assignee: NEC Corporation, Tokyo (JP)

( * ) Notice: Subject to any disclaimer, the term of this patent is extended or adjusted under 35 U.S.C. 154(b) by 608 days.

(21) Appl. No.: 12/736,187

(22) PCT Filed: Mar. 19, 2009

(86) PCT No.: PCT/JP2009/056208
§ 371 (c)(1),
(2), (4) Date: Sep. 17, 2010

(87) PCT Pub. No.: WO2009/116691
PCT Pub. Date: Sep. 24, 2009

(65) Prior Publication Data
US 2011/0014912 A1 Jan. 20, 2011

(30) Foreign Application Priority Data

Mar. 20, 2008 (GB) .................................. 0805320.9
Mar. 25, 2008 (GB) .................................. 0805435.5

(51) Int. Cl.
*H04W 4/00* (2009.01)
*H04W 76/02* (2009.01)

(52) U.S. Cl.
CPC .......... *H04W 76/021* (2013.01); *H04W 76/027* (2013.01)

(58) Field of Classification Search
USPC .................................................... 455/435.1
See application file for complete search history.

(56) References Cited

U.S. PATENT DOCUMENTS 6,006,091 A * 12/1999 Lupien ....................... 455/435.1
6,983,147 B1 * 1/2006 Hans et al. .................... 455/436
7,158,810 B2 1/2007 Schwarz et al.
(Continued)

FOREIGN PATENT DOCUMENTS

CN 1666554 A 9/2005
EP 1 051 054 A3 1/2001
(Continued)

OTHER PUBLICATIONS

U.S. Appl. No. 61/013,021, filed Dec. 12, 2007.*
(Continued)

*Primary Examiner* — Marisol Figueroa
(74) *Attorney, Agent, or Firm* — McGinn IP Law Group, PLLC

(57) ABSTRACT

A method of determining whether to accept a connection request from a user device requesting connection to a communications network is described. The method includes receiving a connection request from the user device, the connection request including a predefined identifier. A message requesting capability information associated with the user device is then generated and transmitted and the capability information is received in response. The method further includes determining whether to permit a connection to the user device based on the capability information and transmitting a message to release or reject or to establish the connection based on the determining. Apparatus for performing the method, including an eNodeB, gateway and user device are also described and corresponding methods of operation these components are provided.

5 Claims, 7 Drawing Sheets

(56) References Cited

U.S. PATENT DOCUMENTS

| | | | |
|---|---|---|---|
| 7,693,543 B2 | 4/2010 | Schwarz et al. | |
| 7,957,352 B2* | 6/2011 | Vanghi et al. | 370/335 |
| 2004/0082326 A1 | 4/2004 | Shaw et al. | |
| 2004/0106430 A1* | 6/2004 | Schwarz et al. | 455/552.1 |
| 2004/0147266 A1* | 7/2004 | Hwang et al. | 455/445 |
| 2007/0264994 A1 | 11/2007 | Schwarz et al. | |
| 2009/0170426 A1* | 7/2009 | Jung et al. | 455/7 |
| 2010/0085962 A1* | 4/2010 | Issaeva et al. | 370/355 |
| 2010/0330959 A1* | 12/2010 | Mildh et al. | 455/410 |

FOREIGN PATENT DOCUMENTS

| | | |
|---|---|---|
| EP | 1 631 016 A1 | 3/2006 |
| EP | 1 737 254 A1 | 12/2006 |
| WO | WO 2004/004407 A1 | 1/2004 |
| WO | WO 2005/060296 A1 | 6/2005 |
| WO | WO 2009/022750 A2 | 2/2009 |

OTHER PUBLICATIONS

NTT DoCoMo Inc., et al., T-Mobile. "A solution for service-based redirection." 3GPP Draft, R2-080922. Sorrento, Italy. Feb. 11-15, 2008.

Catt. "UE Capability Transfer." R2-075533. Vienna, Austria. Dec. 13-14, 2007.

Nokia, Nokia Siemens Networks, Telecom Italia, T-Mobile. "Requirements for Redirection in E-UTRAN." R2-073346. Athens, Greece. Aug. 20-24, 2007.

Chinese Office Action dated Nov. 19, 2012, with English translation.

Chinese Office Action with Chinese Search Report dated Jun. 20, 2013 with translation of the Chinese Search Report.

R2-075561, RRC connection control messages, 3GPP TSG-RAN WG2 LTE RRC ad hoc, Vienna, Austria, Dec. 13-14, 2007.

* cited by examiner

CONNECTION ESTABLISHMENT SYSTEM AND METHOD

TECHNICAL FIELD

The present invention relates to signalling in a telecommunications network, for example, but not exclusively, networks operating according to the 3GPP standards or equivalents or derivatives thereof.

BACKGROUND ART

In telecommunications networks, connections are established between components or nodes in the network. In particular, connections are established between user equipment (UE), such as mobile communication devices, and base station (eNodeB or eNB) components. Further connections are provided between the eNB components and gateway devices, such as Mobility Management Entity (MME) devices in the core network. These connections are established using an exchange of connection request and confirmation messages between the devices in the network.

In some situations, a plurality of different network types may be available offering a plurality of different services to the UE, for example E-UTRAN, UTRAN and GERAN networks. The most appropriate network for the UE to connect to may depend on the capability of the UE and the service required.

One procedure for determining the network to which the UE should connect is set out below. The systems and methods described herein provide a simplified mechanism for service-based redirection.

The various acronyms applicable in the telecommunications network will of course be familiar to those skilled in the art, but a glossary is appended for the benefit of lay readers. Although for efficiency of understanding for those of skill in the art the invention will be described in detail in the context of a E-UTRAN system, the principles of the identifier system can be applied to other systems, e.g. 3G, CDMA or other wireless systems in which users access network services via base station components and gateway devices with the corresponding elements of the system changed as required. The present methods and systems may also be implemented in wireless local area networks (WLANs) or other local or wide area networks (LANs or WANs).

DISCLOSURE OF INVENTION

Aspects of the invention are set out in the independent claims and preferred features are set out in the dependent claims. Further aspects of the systems and methods will be apparent from the description of an embodiment set out below. The invention provides, for all methods disclosed, corresponding computer programs or computer program products for execution on corresponding equipment, the equipment itself (user equipment, nodes, networks or components thereof, including gateway and base station nodes for carrying out the methods described) and methods of configuring and updating the equipment. Features of one aspect may be applied to other aspects.

BRIEF DESCRIPTION OF THE DRAWINGS

Embodiments of the method and system claimed herein will now be described, by way of example, with reference to the accompanying drawings in which:

BEST MODE FOR CARRYING OUT THE INVENTION

Figure 1:
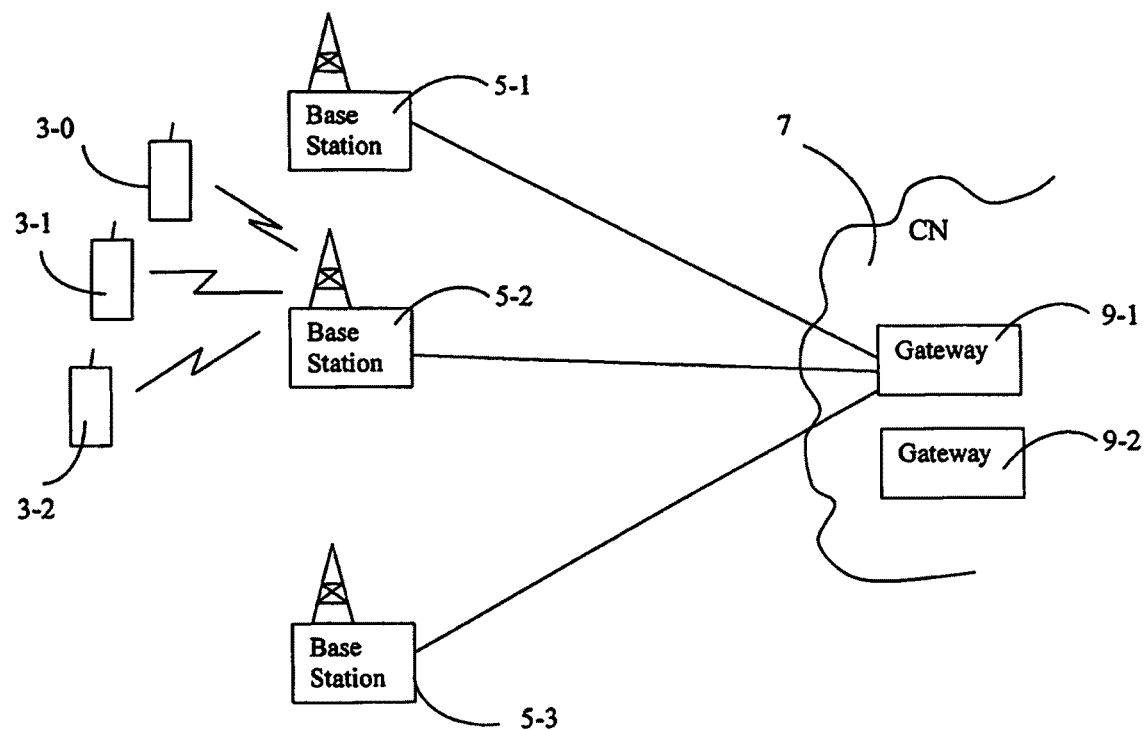
FIG. 1 schematically illustrates part of a mobile telecommunication system of a type to which the embodiment is applicable.
Figure 1:

FIG. 1 schematically illustrates a mobile (cellular) telecommunication system 1 in which users of mobile (or cellular) telephones (MT) 3-0, 3-1, and 3-2 can communicate with other users (not shown) via one of the base stations 5-1, 5-2 or 5-3 and a telephone network 7. The telephone network 7 includes a plurality of components including gateway components 9-1, 9-2. It will be appreciated by the skilled person that the each base station 5-1, 5-2, 5-3 may connect to the telephone network 7 via either gateway 9-1, 9-2 and that all base stations 5-1, 5-2, 5-3 may connect via the same gateway 9-1, 9-2. Similarly, each mobile telephone 3 may connect to the telephone network 7 via either base station 5 and that all mobile telephones 3 may connect via the same base station 5. One or more base stations 5 may be arranged into a Radio Access Network (RAN), controlled by a Radio Network Controller (RNC), which may be implemented as part of a base station 5 in the RAN or as a separate component (not shown).

When a mobile telephone 3 enters the network 7, for example by being switched on, a connection is established between the mobile telephone 3 and a base station 5 and between the base station 5 and a gateway device 9. This enables communication between the mobile telephone 3 and other components in the network 7.

An E-UTRAN protocol network may also be termed an LTE or Long Term Evolution of UTRAN network.

Figure 2:
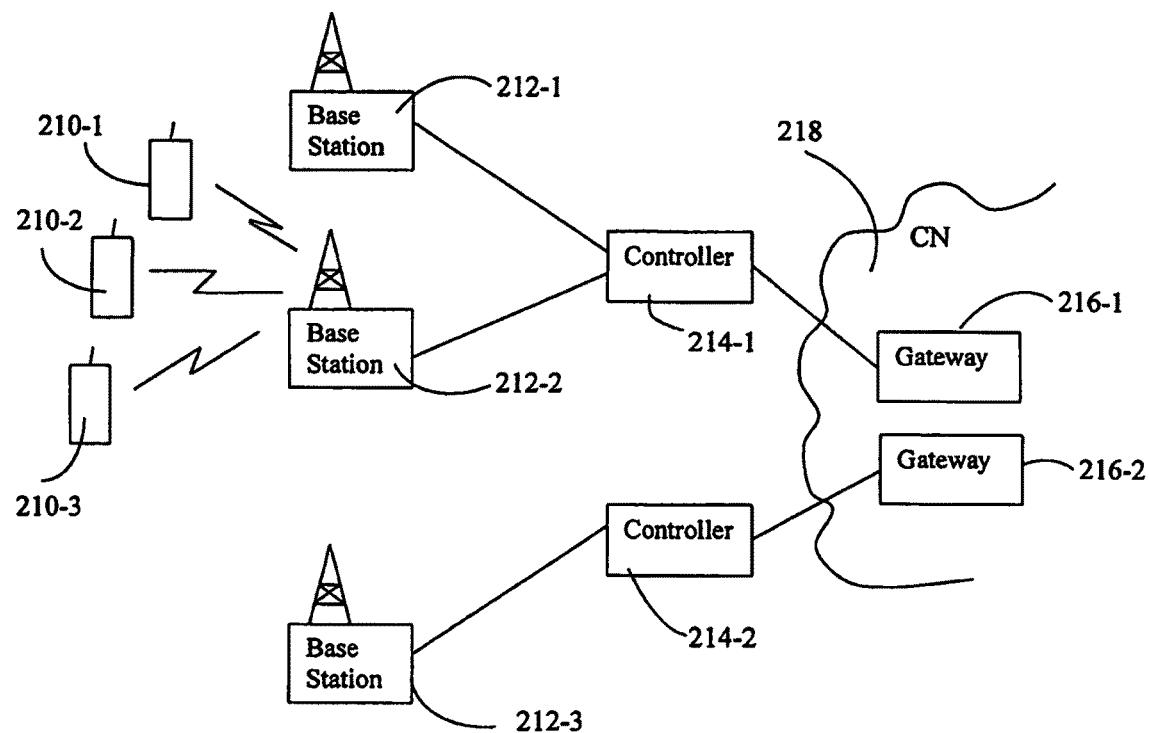
FIG. 2 schematically illustrates part of a second type of mobile telecommunication system to which the embodiment is applicable.

FIG. 2 schematically illustrates a mobile (cellular) telecommunication system 2 according to the UTRAN protocol in which users of mobile (or cellular) telephones (MT) 210-1, 210-2 and 210-3 (which may be termed user devices or user equipment (UE)) can communicate with other users (not shown) via one of the base stations 212-1, 212-2 and 212-3 (which may be termed NodeBs or NBs). Each of the base stations is associated with a network controller 214-1, 214-2, or RNC (Radio Network Controller), which is then connected to a telephone network 218 or Core Network (CN). The telephone network 218 includes a plurality of components including gateway components 216-1, 216-2, in one embodiment SGSNs.

In a UTRAN network, handover of UEs may also be performed between base stations. The handover of a UE between base stations in a UTRAN network may also involve a handover between controllers in the network and a handover between gateway components in the network.

A UTRAN protocol network may also be referred to as a UMTS network (Universal Mobile Telecommunications System network).

Each type of telecommunications network may be termed a Radio Access Technology (RAT).

One skilled in the art will appreciate that each type of network may include fewer or additional network components and FIGS. 1 and 2 are not intended to be limiting in any way.

One reason for enabling the redirection of connections from user devices from E-UTRAN to UTRAN is that LTE introduction in an operator's network does not necessarily mean that all services are provided in a particular operator's network over LTE access from the beginning. For example, voice services may not be provided in E-UTRAN at the beginning as this may limit the LTE deployment flexibility.

Other advantages that may be provided by the claimed Inter-RAT handover system include network sharing, traffic load balancing among different RATs, radio condition degradation in the source RAT and subscription/policy based mobility control.

A service-based redirection procedure will now be described in more detail with reference to FIG. 3.

A UE 310 sends a Radio Resource Control (RRC) Connection Request message to an eNB 312, which replies with an RRC Connection Setup message. The eNB 312 determines the service requested by the UE 310 from an "establishment cause" identifier in the RRC Connection Request message. On receipt of the RRC Connection Setup message, the UE 310 sends an RRC Connection setup complete message, including a Service Request message to the eNB 312.

The eNB 312 then sends an Initial UE message to the MME 314 to request connection of the UE 310 through to the MME 314. The MME 314 replies with an Initial Context Setup Request message to the eNB 312. The Initial Context Setup Request message includes details of the capabilities of the UE 310. The eNB 312 may determine the service that is required to be provided to the UE 310 based on the capability information received from the MME 314, for example based on the bearer level QoS parameters.

The UE 310 sends its capabilities to the MME 314 at the time of Initial Attachment or Tracking Area Update to the network. These are stored in the MME 314 and are downloaded to eNB 312 at the time of Connection Establishment. As a result the UE 310 does not have to send its capabilities as part of every RRC Connection Setup Procedure.

Based on the UE capability information received and the service requested by the UE 310, the eNB 312 determines whether redirection is needed. If no redirection is needed, the UE and the eNB complete the connection of the UE to the network.

If redirection is needed, the eNB 312 sends an RRC Connection Release message to the UE 314, including redirection information, for example the frequency of the UTRAN network to which the UE should connect in order to obtain the requested service.

The eNB 312 also sends a UE Context Release request to the MME 314 to release the resources at the MME.

The UE 310 receives the RRC Connection Release message from the eNB 312, and extracts the UTRAN frequency from the message. The UE 310 then acquires system information for the UTRAN network.

In one embodiment, further information relating to the target cell in the UTRAN network may be sent to the UE from the eNB to facilitate connection to the alternative network, for example using the Network Assisted Cell Change (NACC) procedure.

In some cases, the alternative network may be a GERAN rather than a UTRAN network. In this embodiment, the RRC Connection Release procedure may be enhanced to include system information of the target GERAN cell using the NACC procedure.

The UE 310 performs a cell selection procedure and obtains the relevant system information then sends a new RCC Connection Request message to the base station 316 of the alternative network. This may be, for example, a Radio Network Controller (RNC), a Base Station Controller (BSC) or a Base Transceiver Station (BTS). It is noted that, particularly for a GERAN connection, the relevant system information may already be available in the eNB 312 via the NACC procedure, so the UE 310 may obtain the necessary information from there.

On receipt of the RRC Connection Request message, the RNC/BSC 316 responds to the UE 310 with an RRC Connection Setup message. The UE 310 replies with an RRC Connection Setup Complete message to complete the connection to the RNC/BSC 316.

The UE 310 then performs an Attach procedure to the UTRAN Circuit Switched (CS) domain, more specifically the Visited Mobile Switching Centre (VMSC) 318 and performs CM (Connection Management) setup and radio-bearer setup between the UE and NW nodes (that is, the MSC). The UE 310 is then connected and can access the requested service.

A problem associated with this method, however, is that the full connection setup procedure is undertaken between the UE 310 and the eNB 312 before the eNB 312 determines whether the service can be provided by that network or redirection is needed. This may increase the time before the UE 310 can access the requested service and may waste network resources, such as processing power and bandwidth in the network of the eNB.

Figure 4:
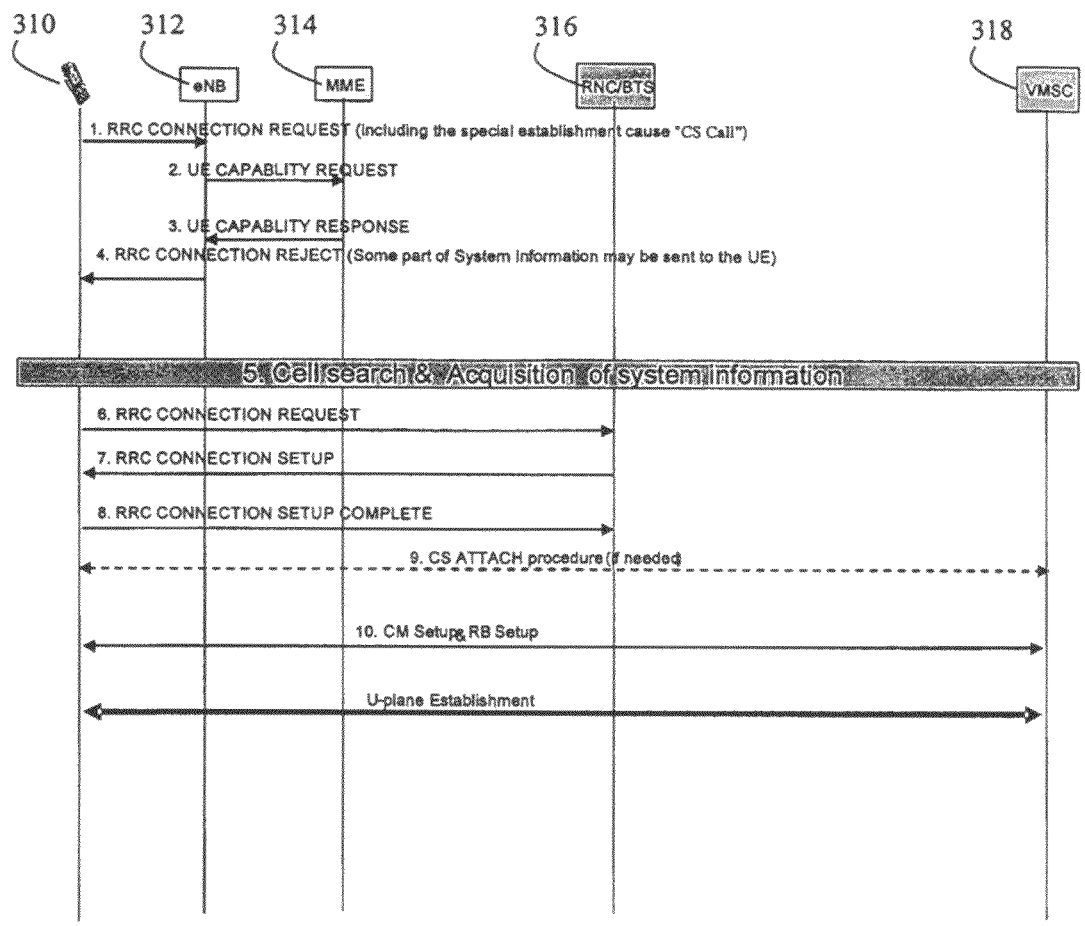
FIG. 4 illustrates a redirection method according to one embodiment.

FIG. 4 illustrates one embodiment of an alternative process for service redirection. In this embodiment, on receipt of an RRC Connection Request message from a UE 310, the eNB 312 sends a UE Capability Request message to the MME 314. A UE Capability Request message is received from the MME 314 from which the eNB 312 can determine whether the service requested by the UE 310 is best provided from that network or whether a redirection to another network is preferable.

If the UE 310 is to be redirected, the eNB 312 can then transmit an RRC Connection Reject message to the UE 310 to reject the connection request. Hence the connection from the UE 310 to the eNB 312 is not established in the proposed procedure if redirection is to be performed.

Preferably, in order to flag the connection request message from the UE to the eNB, the RRC Connection Request message is generated by the UE with a predefined connection establishment cause identified in the request message. In the present embodiment, the establishment cause is indicated as a "MO CS call" (Mobile Originated Circuit Switched call) or a "MT CS call" (Mobile Terminated Circuit Switched call). Other, specific identifiers may also be used to cause the UE to operate according to the procedure described herein. Alternatively, the eNB may handle every connection request from a UE according to the present process.

The appropriate MME from which the eNB should request the UE capability information is preferably identified in the RRC Connection Request message using an S-TMSI (Temporary Mobile Station Identity). (The "S" is used to distinguish that this TMSI is allocated by LTE/SAE (System Architecture Evolution) Network.)

The eNB can then obtain the UE capability information from the MME using the new UE S1 Capability Request procedure described herein and illustrated in FIG. 4. The UE capability information may be Inter-Radio Access Technology (IRAT) capability information for the UE. The eNB can then direct the UE to the appropriate Radio Access Technology (RAT) or network using information sent in the RRC Connection Reject message.

Figure 3:
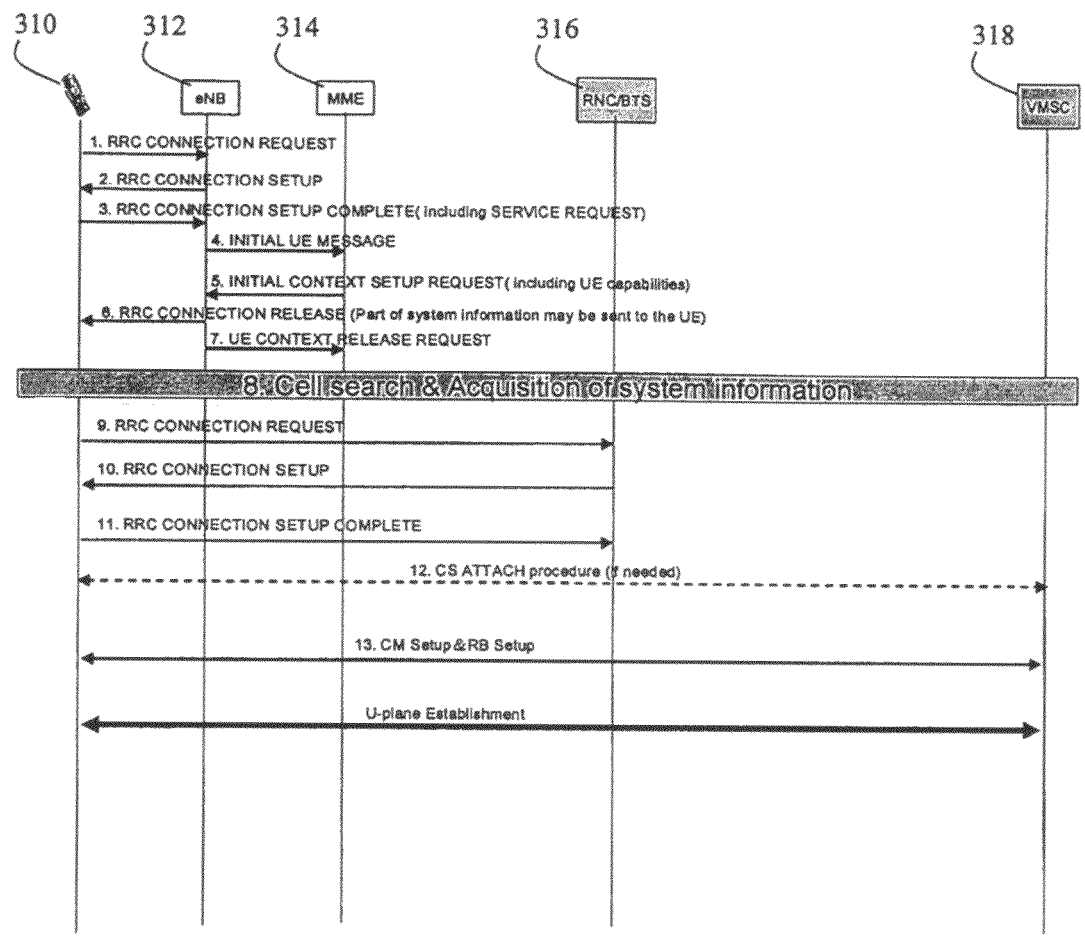
FIG. 3 shows a redirection procedure from E-UTRAN to UTRAN/GERAN according to one embodiment.

As will be appreciated from a comparison of FIGS. 3 and 4, the process of FIG. 4 saves a number of processing steps and message exchange, particularly between the UE 310 and the eNB 312, since a connection is not established between the UE and eNB if the UE is to be redirected. This may also save network resources at the eNB, since resources are not taken up by an unnecessary connection to a UE.

Figure 5:
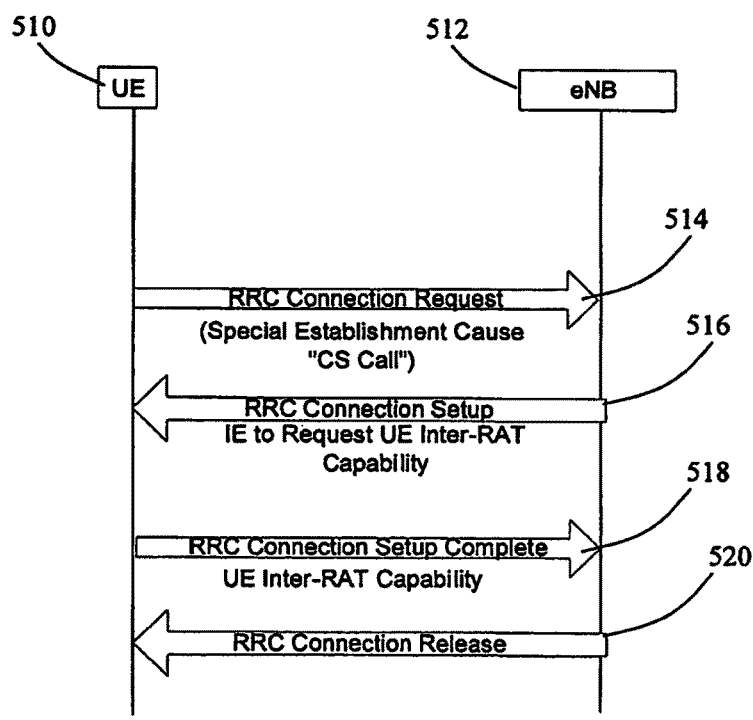
FIG. 5 illustrates a redirection method according to a further embodiment.

FIG. 5 illustrates an embodiment of an alternative system for enabling the eNB 512 to determine whether a redirection of the UE 510 is necessary. As in the procedure described in relation to FIG. 4, the UE 510 uses a predetermined identifier as the establishment cause in the RRC Connection Request message 514, for example "MO CS Call" or "MT CS Call".

An identifier in the RRC Connection Setup message 516 sent from the eNB 512 to the UE 510 is used to request the UE to provide the UE capability information to the eNB 512. The UE 510 sends UE capability information (UE Inter-RAT Capability) to the eNB 512 in the RRC Connection Setup Complete message 518. If no redirection is necessary, the eNB 512 continues with the connection procedure, generating a message for the appropriate MME. If redirection is necessary, the eNB 512 sends an RRC Connection Release message 520 to the UE 510, releasing the connection.

Hence in this embodiment, the eNB establishes whether redirection is necessary without communication with an MME. Therefore network resources are saved in the Core Network, since the MME does not have to process and generate messages or look up information for a UE which is then redirected elsewhere.

It will be appreciated by the skilled person that the two methods illustrated in FIGS. 4 and 5 may be appropriate in different situations. In any particular network, one method may be used exclusively or by default. Alternatively, the appropriate method may be selected by a UE or an eNB at the time of the connection request.

The method illustrated in FIG. 4 may be appropriate, for example, if bandwidth over the air interface between the UE and the eNB is slow, expensive or restricted or if the UE is not capable of responding to a capability request from the eNB.

The method illustrated in FIG. 5 may be appropriate if the network operator wishes to preserve resources in the core network or if the MME does not hold capability information for a particular UE or group of UEs.

It will be appreciated that one method may be used as a backup, or alternative procedure for determining the capability information if the first, preferred method is not successful. For example, the eNB may request UE capability information from the MME, as set out in FIG. 4. If the capability information is not available, or the MME rejects the information request, the eNB may then request the information from the UE in accordance with the procedure illustrated in FIG. 5.

Figure 6:
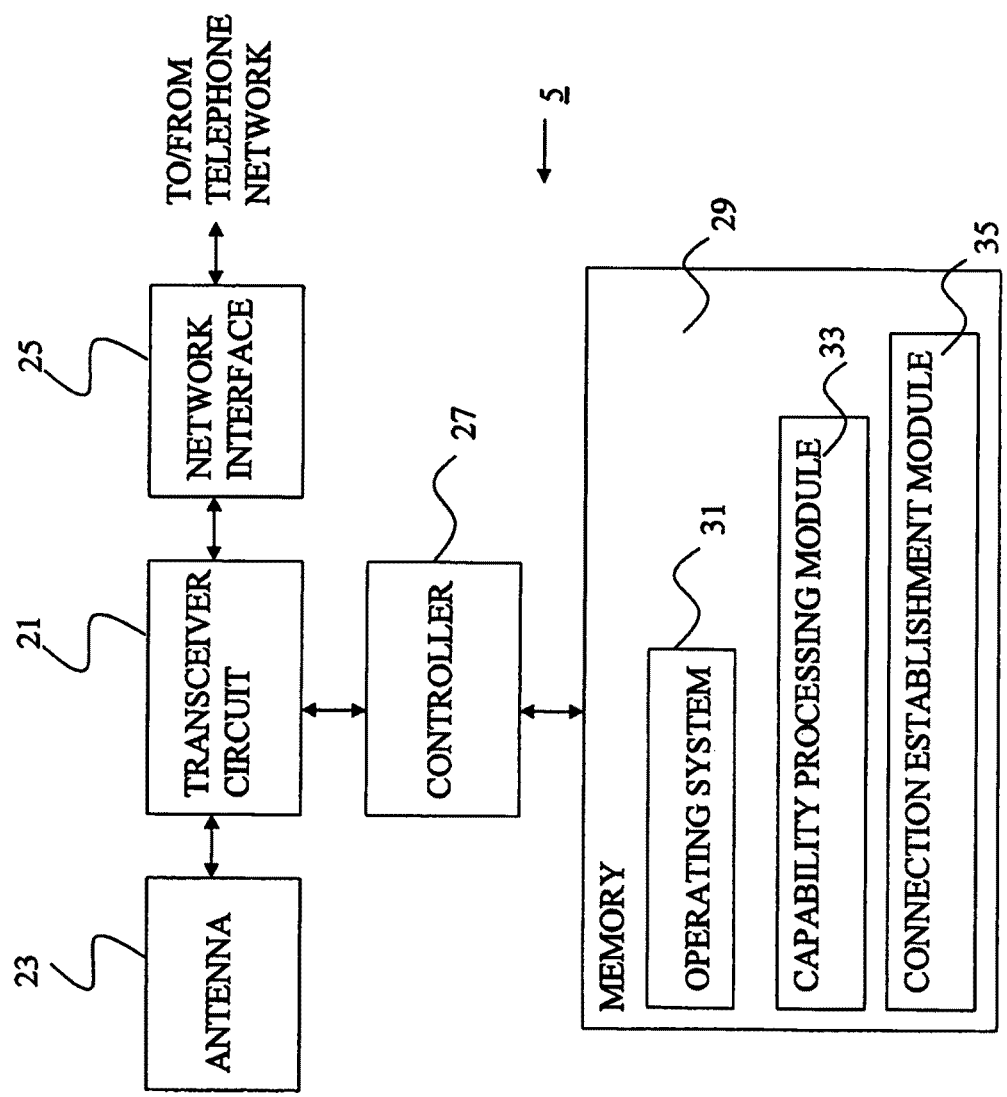
FIG. 6 is a diagram illustrating components of one of the base stations of FIG. 1.

FIG. 6 is a block diagram illustrating the main components of one of the base stations 5 shown in FIG. 1 and used in an embodiment of the invention. As shown, the base station 5 includes a transceiver circuit 21 which is operable to transmit signals to and to receive signals from the mobile telephones 3 via one or more antennae 23 and which is operable to transmit signals to and to receive signals from the telephone network 7 (FIG. 1) via a network interface 25. The operation of the transceiver circuit 21 is controlled by a controller 27 in accordance with software stored in memory 29. The software includes, among other things, an operating system 31 and a capability processing module 33. The capability module 33 is operable for requesting information relating to the capabilities of connecting mobile telephones and processing this information. As shown in FIG. 3, the software also includes a connection establishment module 35 for determining whether to permit the establishment of a connection based on the capability information and for facilitating establishment or rejection of a requested connection.

Figure 7:
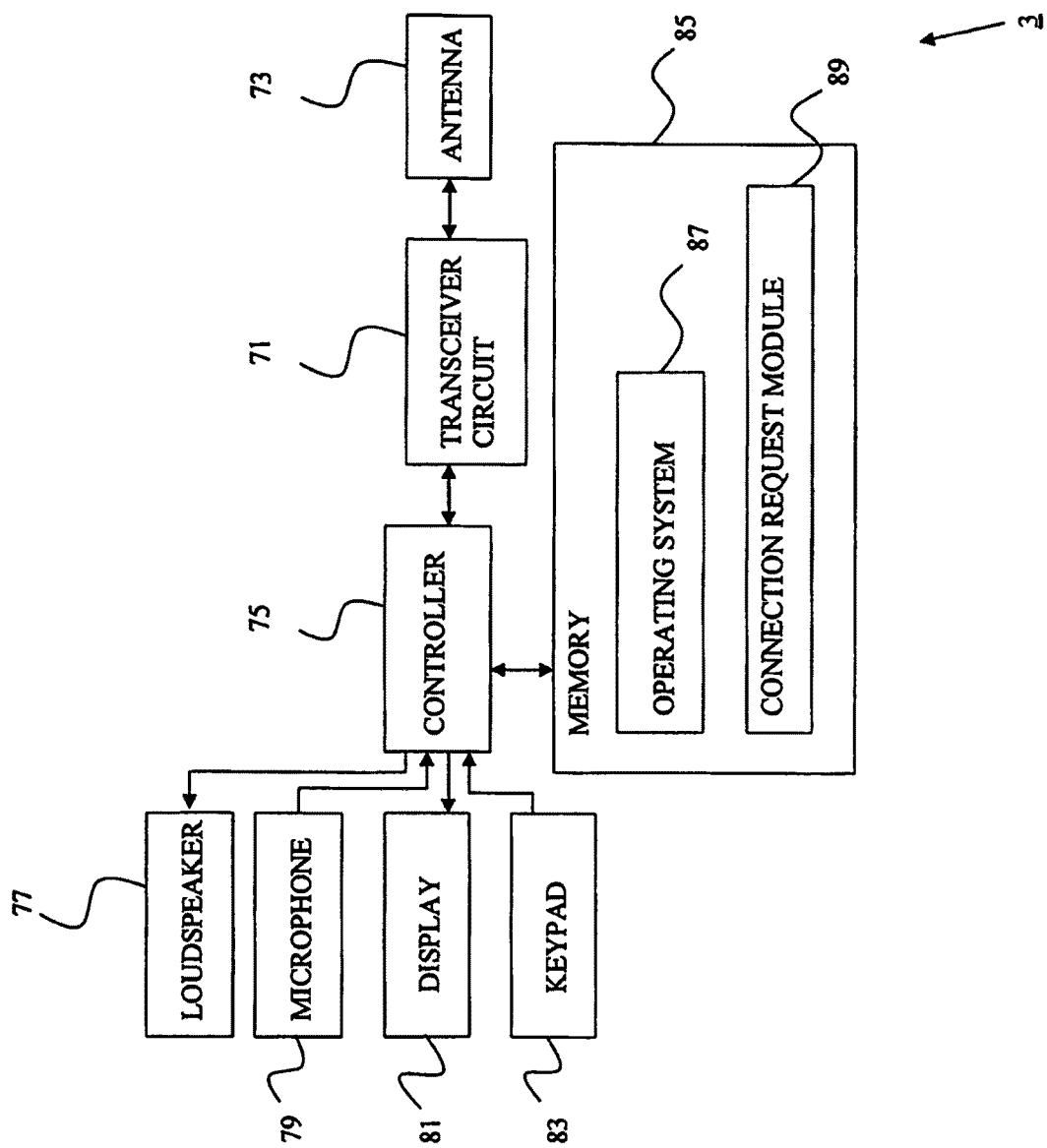
FIG. 7 is a block diagram illustrating components of one of the mobile telephones of FIG. 1.

FIG. 7 is a block diagram illustrating the main components of one of the mobile telephones 3 shown in FIG. 1.

FIG. 7 schematically illustrates the main components of each of the mobile telephones 3 shown in FIG. 1 according to one embodiment. As shown, the mobile telephones 3 include a transceiver circuit 71 which is operable to transmit signals to and to receive signals from the base station 5 (FIG. 1) via one or more antennae 73. As shown, the mobile telephone 3 also includes a controller 75 which controls the operation of the mobile telephone 3 and which is connected to the transceiver circuit 71 and to a loudspeaker 77, a microphone 79, a display 81, and a keypad 83. The controller 75 operates in accordance with software instructions stored within memory 85. As shown, these software instructions include, among other things, an operating system 87 and a connection request module 89. The connection request module 89 is operable to generate connection request messages for transmission to base station components in the network, the connection request messages including a predefined identifier as described herein. The mobile telephone 3 may optionally also include a capability information module (not shown) for storing capability information associated with the mobile telephone and for providing the capability information to the base station on request.

The following is a detailed description of the way in which one embodiment may be implemented in the currently proposed 3GPP LTE standard. Whilst various features are described as being essential or necessary, this may only be the case for the proposed 3GPP LTE standard, for example due to other requirements imposed by the standard. These statements should not, therefore, be construed as limiting the present invention in any way.

Title: Fast CS Service Redirection for LTE
Introduction

In RAN2#61, there were some discussions about how the service based redirection from E-UTRAN to UTRAN and GERAN. In this proposal we propose a method for achieving faster redirection solution which can be applied for both Mobile Originated and Mobile Terminated CS calls in LTE.
2 Discussion In [1] stage 3 proposal service based redirection was proposed. The details of the signaling procedure from [1] is recapitulated in section 2.1 to help the discussion.
2.1 Service-Based Redirection Procedure from E-UTRAN to UTRAN/GERAN FIG. 3 shows a service-based redirection procedure from E-UTRAN to UTRAN/GERAN CS domain.
1. A UE that camps on an E-UTRAN cell sends the RRC CONNECTION REQUEST message to an eNB.
2. The eNB, having received the RRC CONNECTION REQUEST message, sends the RRC CONNECTION SETUP message to the UE. The eNB may determine the service requested by the UE from the IE "establishment cause".
3. The UE, having received the RRC CONNECTION SETUP message, sends the RRC CONNECTION SETUP COMPLETE message including the SERVICE REQUEST message to the eNB.

4. The eNB, having received the RRC CONNECTION SETUP COMPLETE message, sends the INITIAL UE MESSAGE to the MME.
5. The MME, having received the INITIAL UE MESSAGE, sends the INITIAL CONTEXT SETUP REQUEST message including the UE capabilities to the eNB. The eNB may determine the service provided to the UE from the bearer level QoS parameters.
6. The eNB determines whether redirection is needed from the UE capabilities and the service to be provided to the UE. The eNB sends the RRC CONNECTION RELEASE message to the UE, including the necessary redirection information, if the eNB decides that redirection is needed.
7. If the eNB decides that redirection is needed in step 6, the eNB sends the UE CONTEXT RELEASE REQUEST to the MME.
8. The UE receives the RRC CONNECTION RELEASE from the eNB, performs cell selection on the redirected UTRAN frequency and acquires system information. It is FFS if a part of system information on the target cell shall be sent to the UE in step 6 from the source E-UTRAN cell (NACC) to facilitate the procedure. For the interworking with GERAN it is proposed to enhance the RRC CONNECTION RELEASE procedure with redirection to include the System Information of the target GERAN cell by reusing the NACC functionality.
9. The UE sends the RRC CONNECTION REQUEST message to the RNC/BSC after having completed cell selection and having acquired the relevant system information (for GERAN the relevant system information is already available in the eNB by NACC).
10. The RNC/BSC, having received the RRC CONNECTION REQUEST message, sends the RRC CONNECTION SETUP message to the UE.
11. The UE, having received the RRC CONNECTION SETUP message, sends the RRC CONNECTION SETUP COMPLETE message to the RNC/BSC.
12. The UE performs the ATTACH procedure, if the UE has not completed the ATTACH to the UTRAN CS domain.
13. The UE further performs CM setup and radio bearer setup between the UE and NW nodes.

FIG. 3 illustrates a service-based redirection procedure from E-UTRAN to UTRAN CS domain (similar for GERAN CS domain).

2.2 Disadvantages of the Current Proposal in 2.1

An unnecessary delay results from the fact that for redirecting a call, RRC Connection Establishment Procedure would be completed first followed by service context setup in MME, transferring the service context including UE capabilities to eNB and then eNB redirecting the call by RRC Connection Release procedure. We feel that this procedure could be simplified and made faster as proposed below.

2.3 Faster CS Service Redirection Procedure from E-UTRAN to UTRAN/GERAN

Proposal A: Obtaining UE capablities from MME:

A simple solution for reducing the redirection time is proposed in FIG. 4 that could be applied for both MO and MT CS calls.

The difference between the procedures is that UE is mandated to indicate the establishment cause as "MO CS Call" or the cause "MT CS Call" in RRC Connection Request Message during the RRC Connection Establishment to the eNB. The RRC Connection Request shall contain a valid S-TMSI which will be used for identifying the MME for downloading the IRAT UE capabilities.

The eNB can download the UE capability using newly proposed S1 UE capability Request procedure. Based on the received IRAT UE capabilities, the eNB can redirect the UE to the appropriate RAT through RRC Connection Reject message.

Additional IE for RRC Connection Reject Message could be used as proposed in [1] and the UE behaviour could be specified accordingly.

Proposal B: Obtaining UE Capabilities from UE

As in Proposal A, UE is mandated to indicate the establishment cause as "MO CS Call" or the cause "MT CS Call" in RRC Connection Request Message during the RRC Connection Establishment to the eNB. In RRC Connection Setup an IE is used to indicate the UE to send UE Inter-RAT Capability. If this IE is set UE shall include Inter-RAT UE Capabilities in RRC Connection Setup Complete.

The eNB on receiving the RRC Connection Setup Complete, it can determine the UE capability and redirect the UE by sending RRC Connection Release Message which would include the necessary redirection parameters as described in [1]. One embodiment of this procedure is illustrated in FIG. 5.

3 Conclusion

A simplified and faster service-based redirection procedure was discussed. We propose that either of the proposed mechanism be adopted for redirection of CS services Proposal A 1: A new procedure is defined on S1 interface to down load the UE capabilities using S-TMSI provided by UE in the RRC Connection Request.

2: Redirection is carried out using RRC Connection Reject Procedure.

Proposal B

1: New IEs are introduced in RRC Connection Setup Message to request UE to send its Inter-RAT capabilities in RRC Connection Setup Complete.

2: New IEs are introduced in RRC Connection Setup Complete Message to deliver Inter-RAT capabilities to eNB.

3: Redirection is carried out using RRC Connection Reject Procedure.

We urge RAN 2 to adopt the redirection procedure for faster redirection and for efficiently supporting CS fall back functionality.

REFERENCES

R2-080922 "A Solution for Service-Based redirection", NTT DoCoMo, T-Mobile

Glossary of 3GPP Terms
  LTE—Long Term Evolution (of UTRAN)
  E-UTRAN—Evolved UTRAN
  eNodeB—E-UTRAN Node B
  AGW—Access Gateway
  UE—User Equipment—mobile communication device
  DL—downlink—link from base to mobile
  UL—uplink—link from mobile to base
  AM—Acknowledge Mode
  UM—Unacknowledge Mode
  MME—Mobility Management Entity
  UPE—User Plane Entity
  CN—Core Network
  HO—Handover
  RAN—Radio Access Network
  RANAP—Radio Access Network Application Protocol
  RLC—Radio Link Control
  RNC—Radio Network Controller
  RRC—Radio Resource Control
  RRM—Radio Resource Management
  SDU—Service Data Unit
  SRNC—Serving Radio Network Controller PDU—Protocol Data Unit
NAS—Non Access Stratum
ROHC—Robust Header Compression
TA—Tracking Area
U-plane or UP—User Plane
TNL—Transport Network Layer
S1 Interface—Interface between Access Gateway and eNodeB
X2 Interface—Interface between two eNodeBs
MMEs/SAE Gateway—Access Gateway having both MME and UPE entities
MO—Mobile Originated
MT—Mobile Terminated
TMSI—Temporary Mobile Subscriber (or Station) Identifier (or Identity)
I-RAT—Inter—Radio Access Technology
IE—Identifier
CS—Circuit Switched
GERAN—GSM EDGE Radio Access Network This application is based upon and claims the benefit of priority from United Kingdom patent application No. 0805320.9 filed on Mar. 20, 2008, and United Kingdom patent application No. 0805435.5 filed on Mar. 25, 2008, the disclosure of which are incorporated herein by reference.

The invention claimed is:

1. A method performed by a gateway component of providing capability information for a user device in a communications network, the method comprising:
   receiving a request from a base station for capability information associated with the user device, which request for capability information does not form part of an initial user equipment (UE) message;
   obtaining capability information associated with the user device; and
   transmitting the capability information associated with the user device to the base station.

2. A method according to claim 1, further comprising receiving a connection request message from the base station requesting establishment of a connection to the user device.

3. A gateway component for providing capability information for a user device in a communications network, the gateway component comprising:
   a receiver that receives a request from a base station for capability information associated with the user device, which request for capability information does not form part of an initial user equipment (UE) message;
   a processor that obtains capability information associated with the user device; and
   a transmitter that transmits the capability information associated with the user device to the base station.

4. A method according to claim 1, wherein the gateway component receives the request from the base station for the capability information associated with the user device.

5. A method according to claim 4, wherein the gateway component further obtains the capability information associated with the user device and transmits the capability information associated with the user device to the base station.

* * * * *